US012381328B2

(12) United States Patent
Chiang

(10) Patent No.: US 12,381,328 B2
(45) Date of Patent: Aug. 5, 2025

(54) DUAL CIRCULARLY POLARIZED ANTENNA ARRAY

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 112 days.

(21) Appl. No.: 18/539,814

(22) Filed: Dec. 14, 2023

(65) Prior Publication Data

US 2025/0202118 A1 Jun. 19, 2025

(51) Int. Cl.
*H01Q 9/04* (2006.01)
*H01Q 21/06* (2006.01)

(52) U.S. Cl.
CPC ......... *H01Q 9/0428* (2013.01); *H01Q 21/065* (2013.01)

(58) Field of Classification Search
CPC ....... H01Q 9/0428; H01Q 21/065; H01Q 1/38
See application file for complete search history.

(56) References Cited

U.S. PATENT DOCUMENTS

2024/0305014 A1* 9/2024 Huang ................. H01Q 9/0414
2025/0038409 A1* 1/2025 Sakr ..................... H01Q 21/062

* cited by examiner

*Primary Examiner* — David E Lotter
(74) *Attorney, Agent, or Firm* — Li & Cai Intellectual Property (USA) Office

(57) ABSTRACT

A dual circularly polarized antenna array includes an insulating substrate, an M number of feed modules, and an M number of antenna groups. The insulating substrate includes an M number of preset points. The M antenna groups are respectively disposed on the M preset points, and each antenna group includes four antennas. Any two opposite ones of the four antennas jointly have a 180-degree rotational symmetry relative to a corresponding one of the M preset points. Each antenna includes a conductive sheet, and a first feed point and a second feed point that are electrically coupled to one of the M feed modules. The first feed points of the four antennas can jointly generate a left-hand circular polarization through one of the M feed modules, and the second feed points of the four antennas can jointly generate a right-hand circular polarization through one of the M feed modules.

10 Claims, 8 Drawing Sheets

DUAL CIRCULARLY POLARIZED ANTENNA ARRAY

FIELD OF THE DISCLOSURE

The present disclosure relates to an antenna array, and more particularly to a dual circularly polarized antenna array.

BACKGROUND OF THE DISCLOSURE

Despite having achieved circular polarization, a conventional antenna array still has several drawbacks. For example, the conventional antenna array generates circular polarization through cooperation between each antenna and two dual-feed phase shifters, but the high costs of the dual-feed phase shifters may result in a considerable price increase of the conventional antenna array. In another example, while the conventional antenna array achieves circular polarization by feeding 90 degrees of phase difference through cooperation between power distributors and each antenna, high losses are incurred.

SUMMARY OF THE DISCLOSURE

In response to the above-referenced technical inadequacies, the present disclosure provides a dual circularly polarized antenna array.

In order to solve the above-mentioned problems, one of the technical aspects adopted by the present disclosure is to provide a dual circularly polarized antenna array. The dual circularly polarized antenna array includes an insulating substrate, an M number of feed modules, and an M number of antenna groups, and M is a positive integer that is greater than or equal to 1. The insulating substrate includes an M number of preset points. The M feed modules are disposed on the insulating substrate. The M antenna groups are respectively disposed on the M preset points, and each of the M antenna groups includes four antennas. Any two opposite ones of the four antennas jointly have a 180-degree rotational symmetry relative to a corresponding one of the M preset points, and each of the four antennas includes a conductive sheet, a first feed point, and a second feed point. The first feed point and the second feed point are each disposed on the conductive sheet and are spaced apart from each other. The first feed point and the second feed point are electrically coupled to one of the M feed modules. In any two adjacent ones of the four antennas along a clockwise direction or a counterclockwise direction, a phase difference between the first feed points of the two antennas is 90 degrees, and a phase difference between the second feed points of the two antennas is 90 degrees. The first feed points of the four antennas are configured to jointly generate a left-hand circular polarization through one of the M feed modules, and the second feed points of the four antennas are configured to jointly generate a right-hand circular polarization through one of the M feed modules.

Therefore, in the dual circularly polarized antenna array provided by the present disclosure, by virtue of "any two opposite ones of the four antennas jointly having a 180-degree rotational symmetry relative to a corresponding one of the M preset points," and "in any two adjacent ones of the four antennas along a clockwise direction or a counterclockwise direction, a phase difference between the first feed points of the two antennas being 90 degrees, and a phase difference between the second feed points of the two antennas being 90 degrees," the costs and losses of the dual circularly polarized antenna array can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
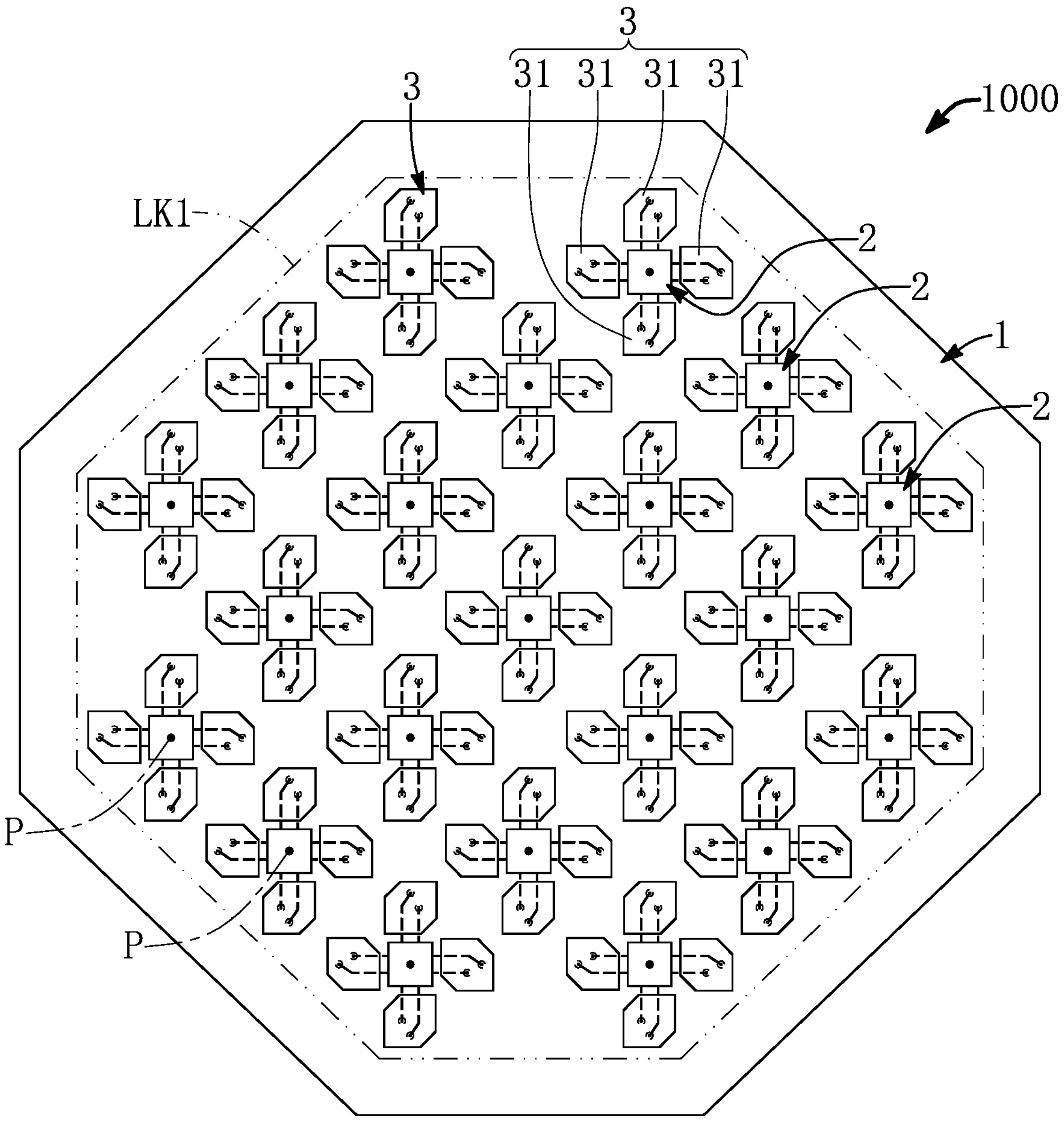
FIG. 1 is a schematic planar view of a dual circularly polarized antenna array according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
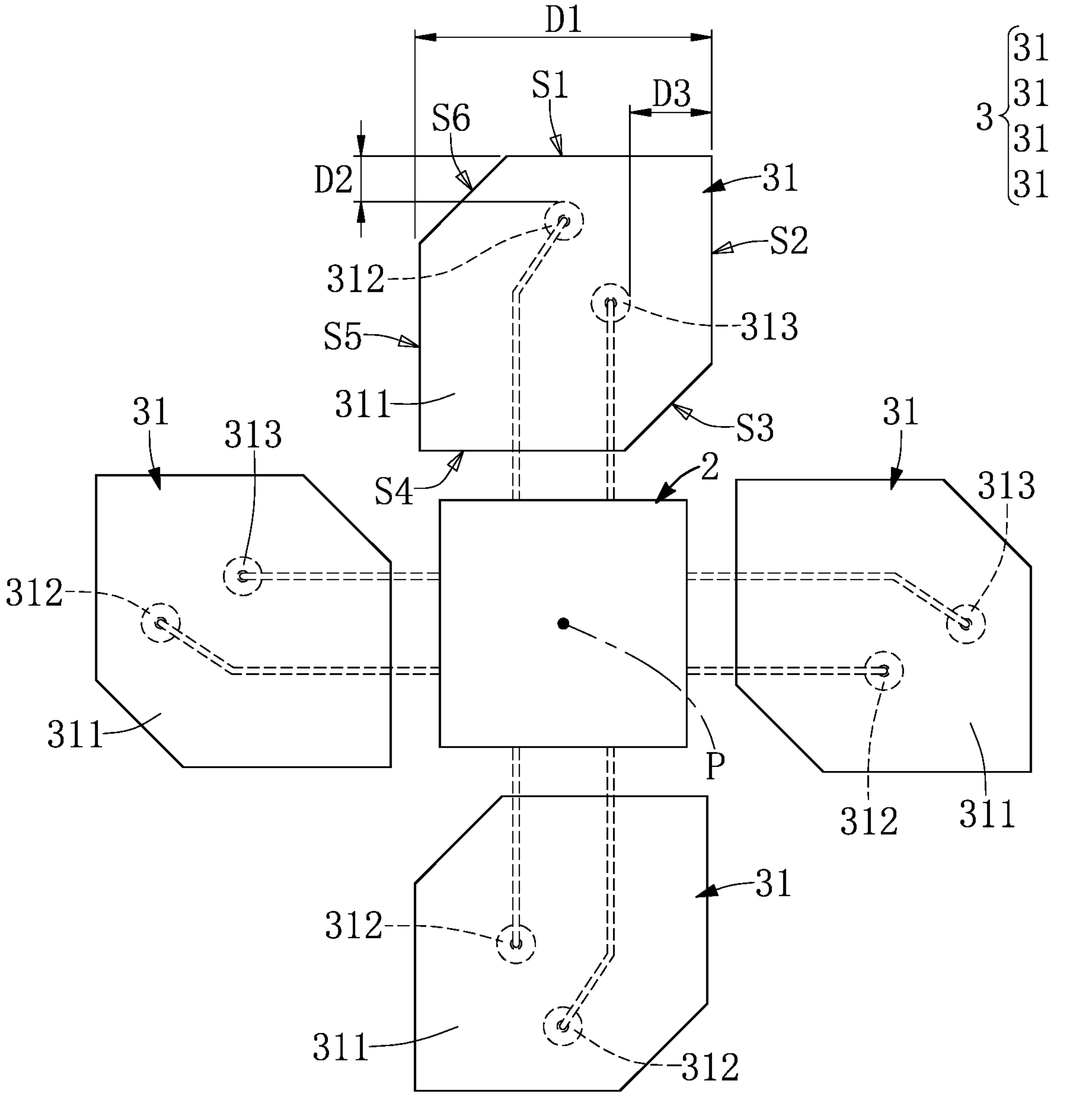
FIG. 2 is a schematic planar view of an antenna group and a feed module according to the present disclosure.
Figure 3:
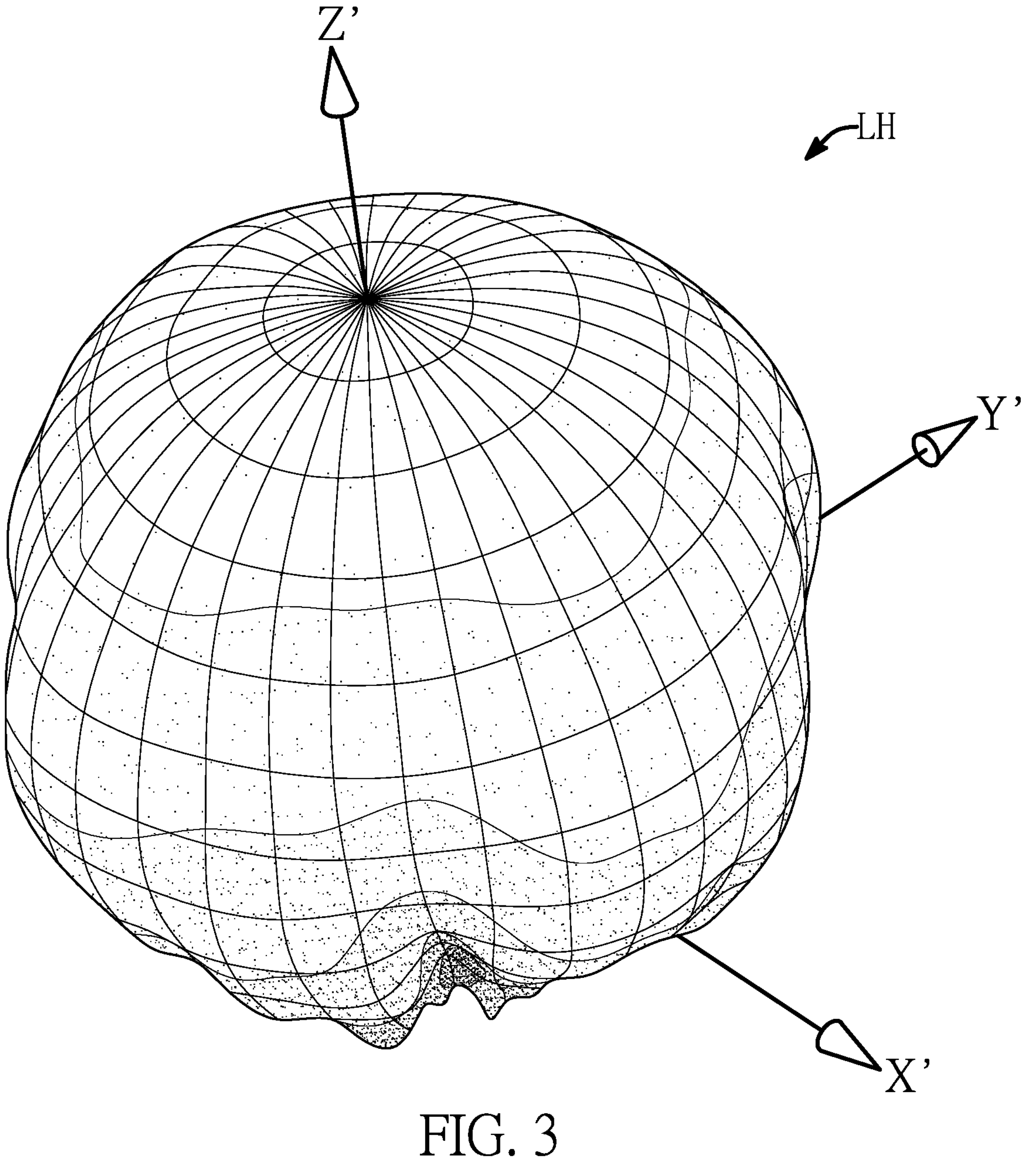
FIG. 3 is a schematic perspective view of a left-hand circular polarization generated by the antenna group in cooperation with the feed module according to the present disclosure.
Figure 4:
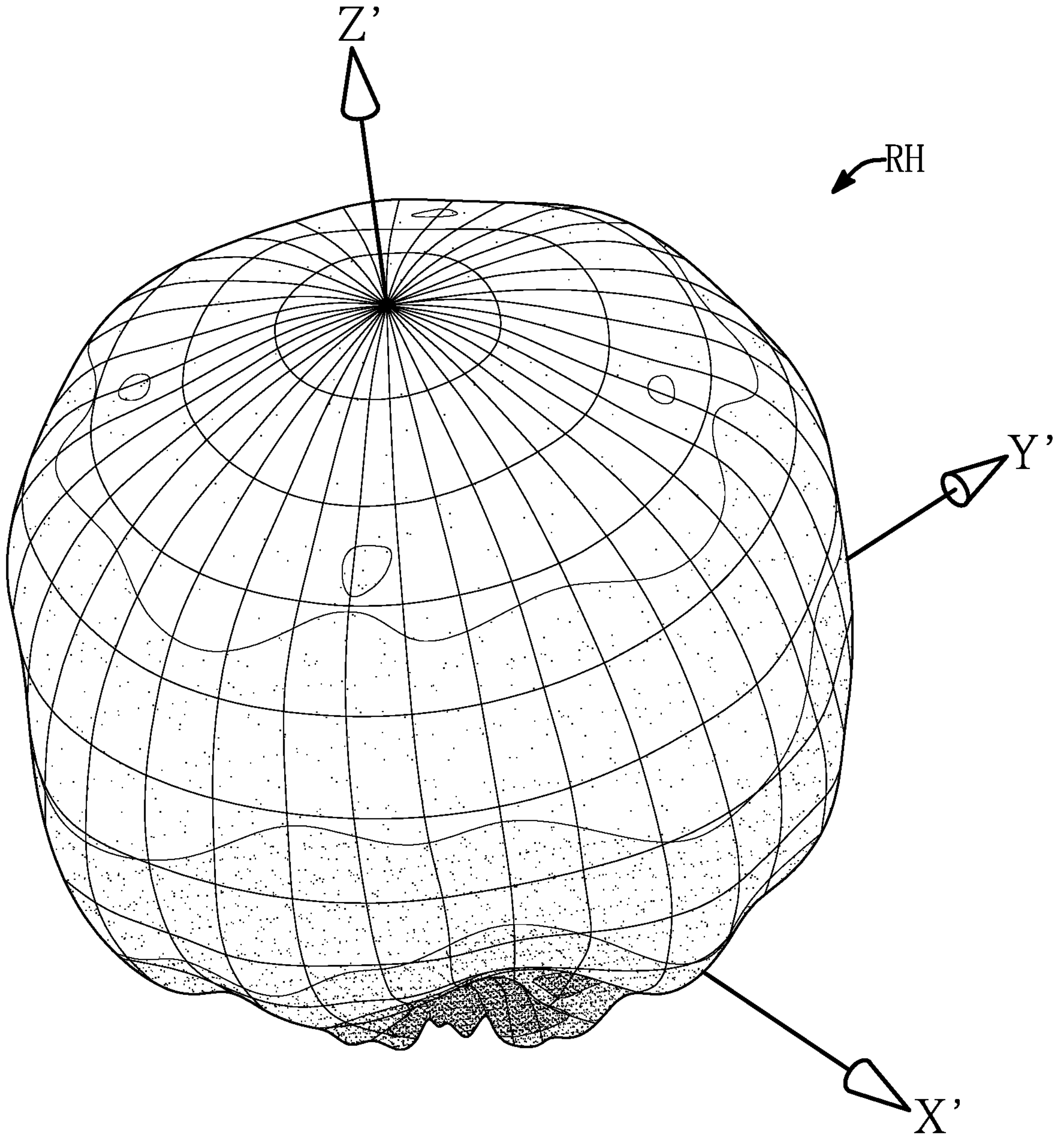
FIG. 4 is a schematic perspective view of a right-hand circular polarization generated by the antenna group in cooperation with the feed module according to the present disclosure.

Referring to FIG. 1 to FIG. 8, the present disclosure provides a dual circularly polarized antenna array 1000. The dual circularly polarized antenna array 1000 is applicable for a transmission frequency band, and can simultaneously generate a left-hand circular polarization LH and a right-hand circular polarization RH (as shown in FIG. 3 and FIG. 4). In other words, any antenna array that cannot simultaneously generate the left-hand circular polarization LH and the right-hand circular polarization RH is not the dual circularly polarized antenna array 1000 of the present disclosure. As shown in FIG. 1 and FIG. 2, the dual circularly polarized antenna array 1000 includes an insulating substrate 1, and an M number of feed modules 2 and an M number of antenna groups 3 that are disposed on the insulating substrate 1 (in which M is a positive integer that is greater than or equal to 1). The following description describes the structure and connection relation of each component of the dual circularly polarized antenna array 1000.

Referring to FIG. 1, the insulating substrate 1 in the present embodiment 1 is a rectangular plate structure, but the present disclosure is not limited thereto. The insulating substrate 1 includes an M number of preset points P that are spaced apart from each other, and the M preset points P are hypothetical points pre-planned based on the quantity and positions of the M antenna groups 3.

Referring to FIG. 1 and FIG. 2, the M antenna groups 3 are respectively disposed on the M preset points P, and each of the M antenna groups 3 includes four antennas 31. Since components and the configuration of each of the antenna groups 3 are substantially the same, a single one of the antenna groups 3 will be introduced below.

Referring to FIG. 2, each of the four antennas 31 includes a conductive sheet 311, and a first feed point 312 and a second feed point 313 that are disposed on the conductive sheet 311. In the present embodiment, the conductive sheet 311 is a conductive copper foil having a hexagonal structure, and has six side edges. In addition, a first shortest distance D1 is defined between any two opposite ones of the side edges parallel to each other, and the first shortest distance D1 is 0.45 to 0.55 times a wavelength corresponding to a center frequency of the transmission frequency band.

Taking the antenna 31 (which is positioned upward) in FIG. 2 as an example, the conductive sheet 311 sequentially has a first side edge S1, a second side edge S2, a third side edge S3, a fourth side edge S4, a fifth side edge S5, and a sixth side edge S6 along a clockwise direction. The first side edge S1 is positioned opposite and parallel to the fourth side edge S4, the second side edge S2 is positioned opposite and parallel to the fifth side edge S5, and the third side edge S3 is positioned opposite and parallel to the sixth side edge S6. When the wavelength corresponding to the center frequency of the transmission frequency band is 12 millimeters (mm), the shortest distance between the first side edge S1 and the fourth side edge S4, the shortest distance between the second side edge S2 and the fifth side edge S5, and the shortest distance between the third side edge S3 and the sixth side edge S6 can be in a range of from 5.4 millimeters (mm) to 6.6 millimeters (mm).

Referring to FIG. 2, the first feed point 312 and the second feed point 313 are each disposed on the conductive sheet 311, and are spaced apart from each other. The first feed point 312 and the second feed point 313 are electrically coupled to one of the feed modules 2.

In detail, a second shortest distance D2 is defined between a projection position of the first feed point 312 that is orthogonally projected toward the conductive sheet 311 and an adjacent one of the side edges, a third shortest distance D3 is defined between a projection position of the second feed point 313 that is orthogonally projected toward the conductive sheet 311 and an adjacent one of the side edges. The second shortest distance D2 is not equal to the third shortest distance D3. In the present embodiment, the first feed point 312 serves the transmission purpose (i.e., TX), while the second feed point 313 serves the reception purpose (i.e., RX). Therefore, the second shortest distance D2 is preferably less than the third shortest distance D3, but the present disclosure is not limited thereto.

In addition, in any two adjacent ones of the four antennas 31 along the clockwise direction or a counterclockwise direction, a phase difference between the first feed points 312 of the two antennas 31 is 90 degrees, and a phase difference between the second feed points 313 of the two antennas 31 is 90 degrees. The first feed points 312 of the four antennas 31 can jointly generate a left-hand circular polarization LH through one of the M feed modules 2 (as shown in FIG. 3), and the second feed points 313 of the four antennas 31 can jointly generate a right-hand circular polarization RH through one of the M feed modules 2 (as shown in FIG. 4). In FIG. 3 and FIG. 4, a lower dot density indicates a higher gain value.

In practice, suppose signals of (1W, 0 degrees) are input to the first feed point 312 and the second feed point 313 of one of the four antennas 31 in FIG. 2, signals of (1W, 270 degrees), (1W, 180 degrees), and (1W, 90 degrees) are sequentially input to the first feed points 312 of the remaining three antennas 31 along the clockwise direction, and signals of (1W, 90 degrees), (1W, 180 degrees), and (1W, 270 degrees) are sequentially input to the second feed points 313 of the remaining three antennas 31 along the clockwise direction. In other words, a phase input to the first feed points 312 of the four antennas 31 increases along the clockwise direction, while a phase input to the second feed points 313 of the four antennas 31 decreases along the clockwise direction. Naturally, any two adjacent ones of the antenna groups 3 also need to comply with such requirement.

It should be noted that, in order to ensure that the left-hand circular polarization LH and the right-hand circular polarization RH generated by each of the antenna groups 3 can have a low return loss, the four antennas 31 in the present embodiment are arranged in a cross-shaped pattern by taking one of the M preset points P that corresponds in position thereto as the center. That is, two of the four antennas 31 are located opposite to each other, and the other two of the four antennas 31 are located opposite to each other. For example, by taking the preset point P as the center, the four antennas 31 are located at 0 degrees, 90 degrees, 180 degrees, and 270 degrees azimuth, respectively.

Moreover, in the four antennas 31 of each of the antenna groups 3, any two opposite ones of the four antennas 31 jointly have a 180-degree rotational symmetry relative to a corresponding one of the M preset points P. In other words, the antenna 31 located at 0 degrees azimuth is rotationally symmetric by 180 degrees to the antenna 31 located at 180 degrees azimuth, and the antenna 31 located at 90 degrees azimuth is rotationally symmetric by 180 degrees to the antenna 31 located at 270 degrees azimuth.

As shown in FIG. 2, in a practical application, two adjacent ones of the four antennas 31 along the clockwise direction or the counterclockwise direction jointly have a 90-degree rotational symmetry relative to a corresponding one of the M preset points P. In other words, the antenna 31 located at 0 degrees azimuth is rotationally symmetric by 90 degrees to the antenna 31 located at 90 degrees azimuth, the antenna 31 located at 90 degrees azimuth is rotationally symmetric by 90 degrees to the antenna 31 located at 180 degrees azimuth, the antenna 31 located at 180 degrees azimuth is rotationally symmetric by 90 degrees to the antenna 31 located at 270 degrees azimuth, and the antenna 31 located at 270 degrees azimuth is rotationally symmetric by 90 degrees to the antenna 31 located at 0 degrees azimuth.

In other words, the four antennas 31 have identical structures. In any two adjacent ones of the four antennas 31, each component of one of the two antennas 31 can be overlapped with each component of another one of the two antennas 31 by rotating 90 degrees along the clockwise direction and by translating moderately along the clockwise direction.

Figure 5:
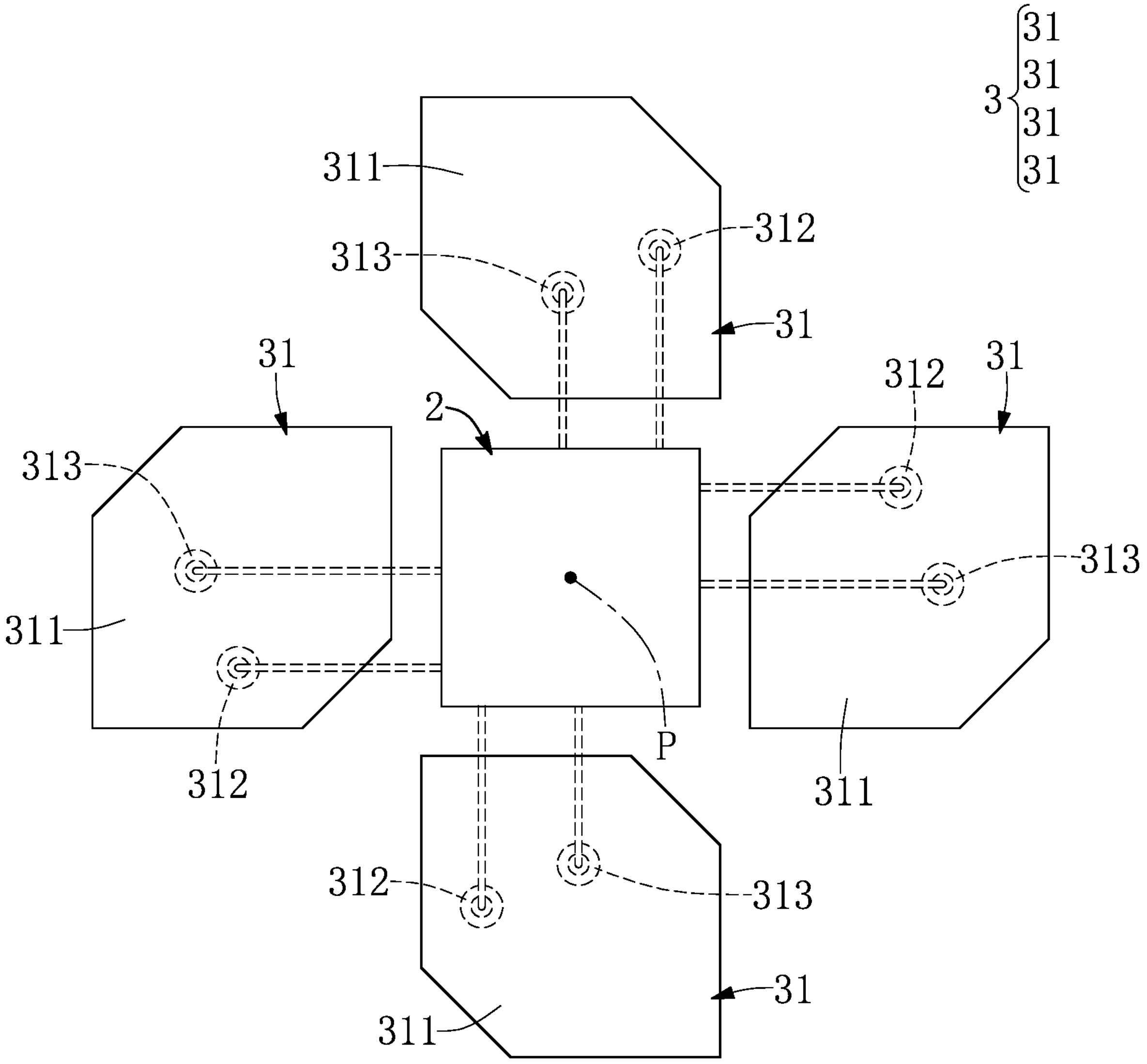
FIG. 5 is a schematic planar view of another configuration of the antenna group and the feed module according to the present disclosure.

In another practical application, as shown in FIG. 5, in any two adjacent ones of the four antennas 31, one of the two antennas 31 can overlap with another one of the two antennas 31 by rotating 90 degrees along the counterclockwise direction and by translating moderately along the clockwise direction. That is, the conductive sheet 311, the first feed point 312, and the second feed point 313 of the one of the two antennas 31 overlap with the conductive sheet 311, the first feed point 312, and the second feed point 313 of the another one of the two antennas 31. It should be noted that, in FIG. 5, the first feed point 312 and the second feed point 313 can be connected to the feed module 2 in the same manner as that shown in FIG. 2.

Figure 6:
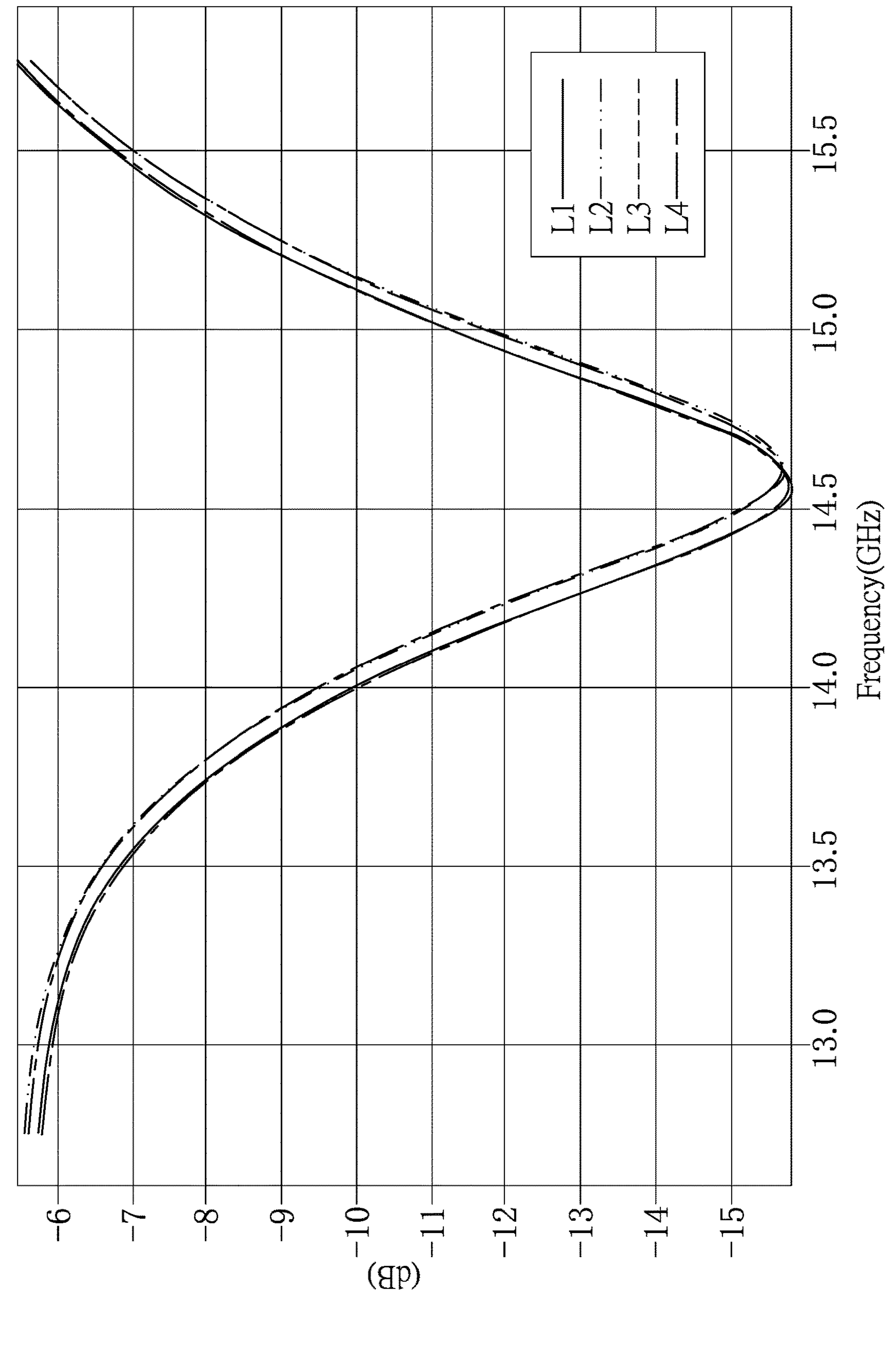
FIG. 6 is a schematic diagram showing a return loss of the left-hand circular polarization according to the present disclosure.
Figure 7:
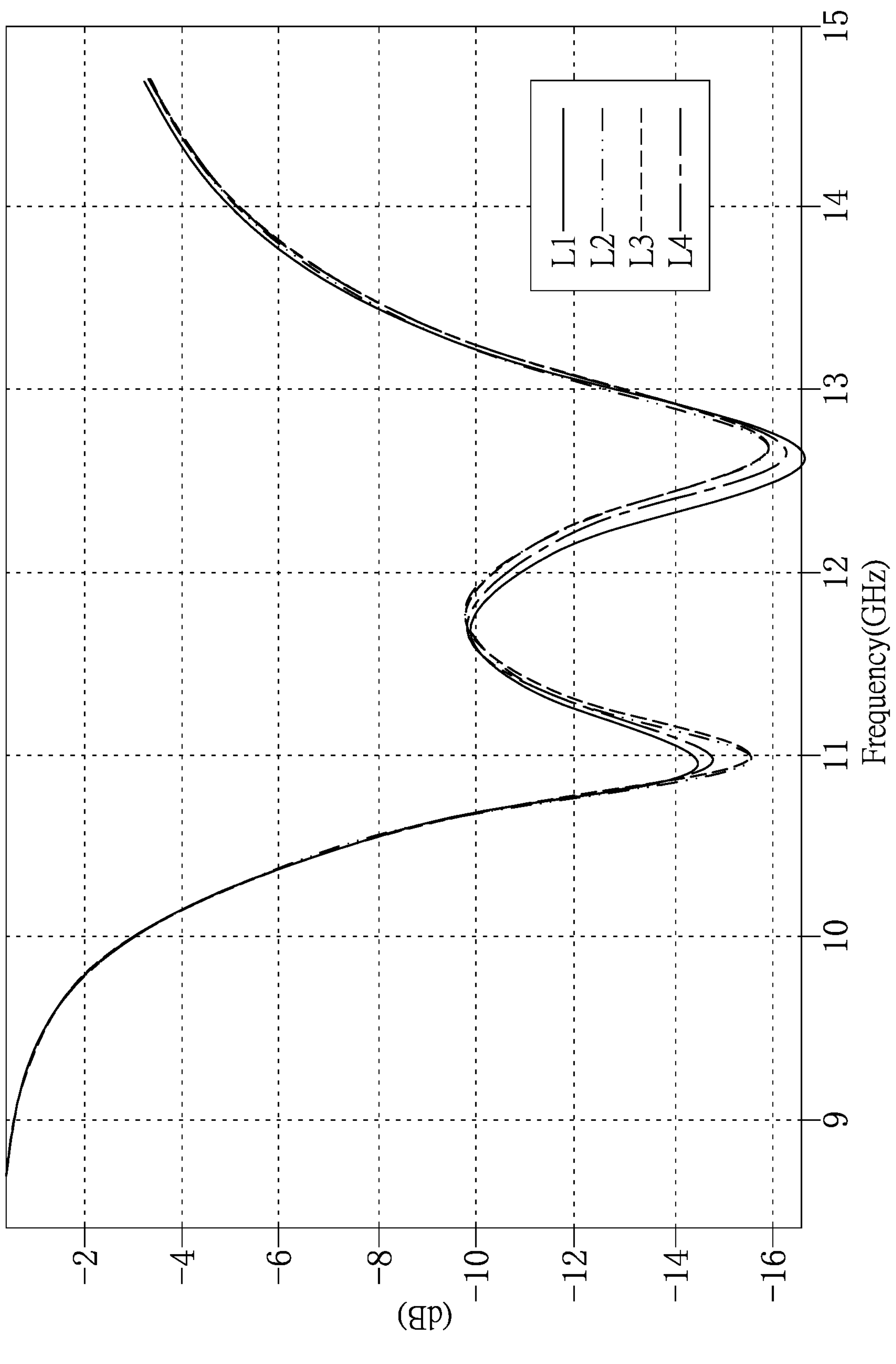
FIG. 7 is a schematic diagram showing a return loss of the right-hand circular polarization according to the present disclosure.

It should be noted that FIG. 6 shows the actual return loss results for the left-hand circular polarization LH of each of the antenna groups 3, while FIG. 7 shows the actual return loss results for the right-hand circular polarization RH of each of the antenna groups 3. In FIG. 6 and FIG. 7, the horizontal axis represents the frequency, the vertical axis represents the power, and four value lines L1 to L4 are detected. The Sij of the value line L1 is (1,1), the Sij of the value line L2 is (2,2), the Sij of the value line L3 is (3,3), and the Sij of the value line L4 is (4,4). The Sij values represent the energy input from the ith input port and the energy measured at the jth output port.

It can be observed from FIG. 6 and FIG. 7 that the left-hand circular polarization LH has power levels below-10 dB between 14 GHz and 14.5 GHZ, and the right-hand circular polarization RH has power levels below-10 dB between 10.7 GHz and 12.7 GHZ. That is to say, a frequency range of the left-hand circular polarization LH of each of the antenna groups 3 is preferably within a range from 14 GHz to 14.5 GHZ, and a frequency range of the right-hand circular polarization RH is preferably within a range from 10.7 GHz to 12.7 GHZ.

Referring to FIG. 1 and FIG. 2, the M feed modules 2 are respectively defined as M number of beam forming chips that are respectively arranged at the M preset points P. Any one of the beam forming chips is electrically coupled to the first feed points 312 and the second feed points 313 of the four antennas 31 in one of the antenna groups 3 that correspond in position to the one of the beam forming chips. That is to say, the first feed points 312 and the second feed points 313 of the four antennas 31 share the same beam forming chip.

It is worth mentioning that when the first feed points 312 and the second feed points 313 of the four antennas 31 share the same beam forming chip, a common contour arranged by the M antenna groups 3 is a regular polygon. In other words, the insulating substrate 1 has a regular polygonal region LK1, and the M preset points P are disposed in the regular polygonal region LK1, so that the common contour of the M antenna groups 3 can be in the form of a regular polygon.

Figure 8:
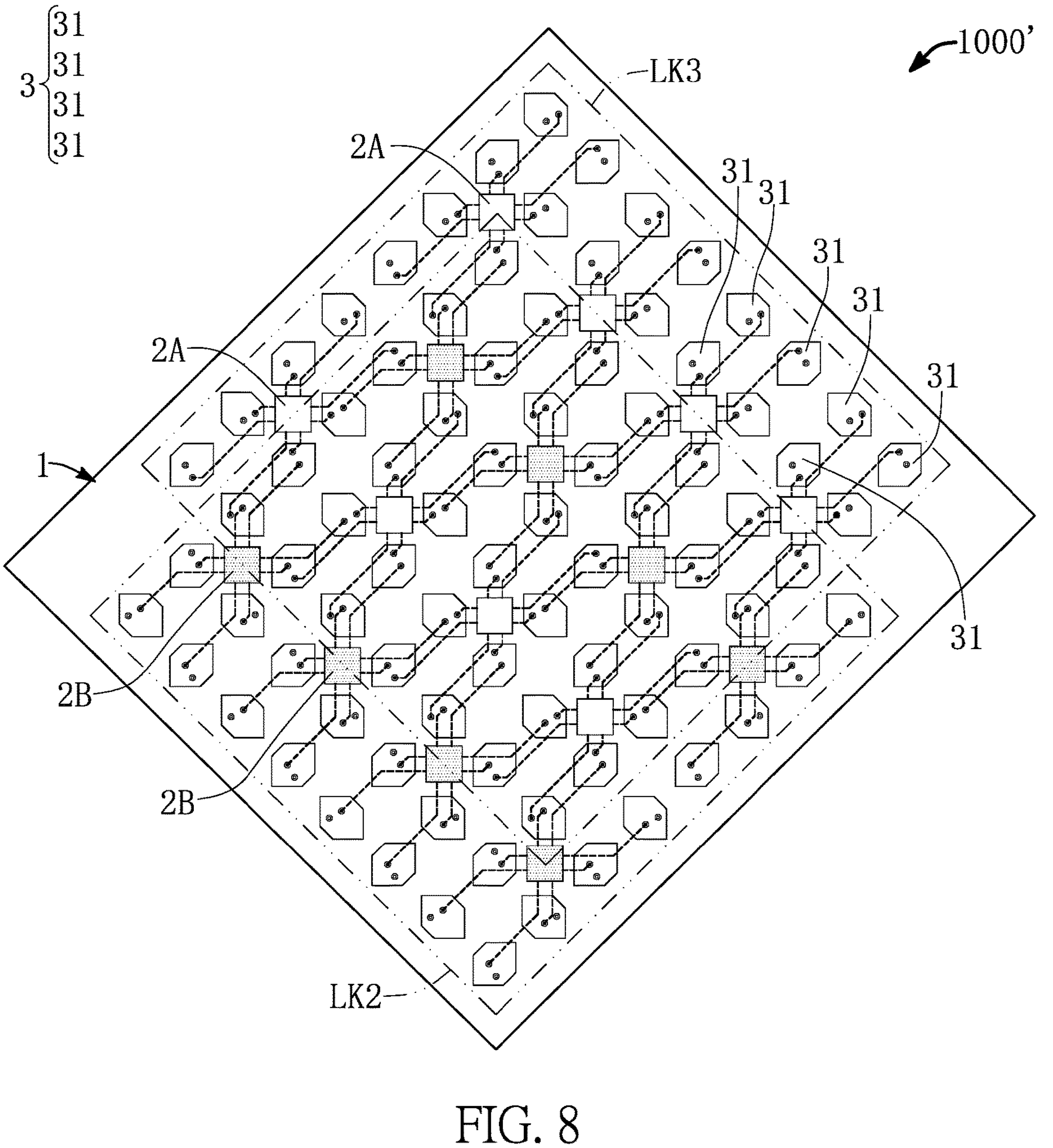
FIG. 8 is a schematic planar view of another configuration of the dual circularly polarized antenna array according to the present disclosure.

In another embodiment, as shown in FIG. 8, the M feed modules 2 of a dual circularly polarized antenna array 1000' are respectively defined as N number of beam forming chips (N is a positive integer less than M). Each of the beam forming chips is disposed between any two adjacent ones of the preset points P. Any one of the beam forming chips is electrically coupled to the first feed points 312 or the second feed points 313 of the four antennas 31 in the two antenna groups 3.

In other words, half of the N beam forming chips are each electrically coupled to the first feed points 312 of the four antennas 31 in two of the antenna groups 3 (i.e., a total of eight of the first feed points 312). The other half of the N beam forming chips are each electrically coupled to the second feed points 313 of the four antennas 31 in another two of the antenna groups 3 (i.e., a total of eight of the second feed points 313). In practice, in order to ensure miniaturization of the dual circularly polarized antenna array 1000', the first feed points 312 or the second feed points 313 of the four antennas 31 located near an edge of the insulating substrate 1 may not be connected to the beam forming chip. In this way, a space utilization rate and electrical reliability of the N beam forming chips on the insulating substrate 1 can be improved.

For example, the half of the N beam forming chips that are electrically coupled to the first feed points 312 are each defined as a first beam forming chip 2A, and the other half of the N beam forming chips that are electrically coupled to the second feed points 313 are each defined as a second beam forming chip 2B. The M antenna groups 3 are arranged into a first rectangular array LK2 and a second rectangular array LK3, and the first rectangular array LK2 and the second rectangular array LK3 are partially overlapped with each other (i.e., the first rectangular array LK2 and the second rectangular array LK3 share multiple ones of the antenna groups 3). In the first rectangular array LK2, the second feed points 313 of the antenna groups 3 that are not overlapped in the second rectangular array LK3 are not connected to any second beam forming chip 2B. In the second rectangular array LK3, the first feed points 312 of the antenna groups 3 that are not overlapped in the first rectangular array LK2 are not connected to any first beam forming chip 2A. In addition, the first beam forming chips 2A and the second beam forming chips 2B can also be disposed on opposite side surfaces of the insulating substrate 1, so as to improve a space utilization rate and electrical reliability.

BENEFICIAL EFFECTS OF THE EMBODIMENTS

In conclusion, in the dual circularly polarized antenna array provided by the present disclosure, by virtue of "any two opposite ones of the four antennas jointly having a 180-degree rotational symmetry relative to a corresponding one of the M preset points," and "in any two adjacent ones of the four antennas along a clockwise direction or a counterclockwise direction, a phase difference between the first feed points of the two antennas being 90 degrees, and a phase difference between the second feed points of the two antennas being 90 degrees," the costs and losses of the dual circularly polarized antenna array can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual circularly polarized antenna array, comprising:

an insulating substrate including an M number of preset points, wherein M is a positive integer that is greater than or equal to 1;

an M number of feed modules disposed on the insulating substrate; and an M number of antenna groups respectively disposed on the M preset points, wherein each of the M antenna groups includes:

four antennas, wherein any two opposite ones of the four antennas jointly have a 180-degree rotational symmetry relative to a corresponding one of the M preset points, and each of the four antennas includes:

a conductive sheet; and a first feed point and a second feed point, wherein the first feed point and the second feed point are each disposed on the conductive sheet, and are spaced apart from each other; wherein the first feed point and the second feed point are electrically coupled to one of the M feed modules;

wherein, in any two adjacent ones of the four antennas along a clockwise direction or a counterclockwise direction, a phase difference between the first feed points of the two antennas is 90 degrees, and a phase difference between the second feed points of the two antennas is 90 degrees; wherein the first feed points of the four antennas are configured to jointly generate a left-hand circular polarization through one of the M feed modules, and the second feed points of the four antennas are configured to jointly generate a right-hand circular polarization through one of the M feed modules.

2. The dual circularly polarized antenna array according to claim 1, wherein the dual circularly polarized antenna array is applicable for a transmission frequency band; wherein each of the four antennas has a plurality of side edges, a first shortest distance is defined between any two opposite ones of the side edges that are parallel to each other, and the first shortest distance is 0.45 to 0.55 times a wavelength corresponding to a center frequency of the transmission frequency band.

3. The dual circularly polarized antenna array according to claim 2, wherein a second shortest distance is defined between a projection position of the first feed point that is orthogonally projected toward the conductive sheet and an adjacent one of the side edges, a third shortest distance is defined between a projection position of the second feed point that is orthogonally projected toward the conductive sheet and an adjacent one of the side edges, and the second shortest distance is not equal to the third shortest distance.

4. The dual circularly polarized antenna array according to claim 3, wherein the second shortest distance is less than the third shortest distance.

5. The dual circularly polarized antenna array according to claim 1, wherein a frequency of the left-hand circular polarization is within a range from 14 GHz to 14.5 GHZ, and a frequency of the right-hand circular polarization is within a range from 10.7 GHz to 12.7 GHZ.

6. The dual circularly polarized antenna array according to claim 1, wherein the M feed modules are respectively defined as an M number of beam forming chips, and the M beam forming chips are respectively disposed at the M preset points; wherein any one of the beam forming chips is electrically coupled to the first feed points and the second feed points of the four antennas in one of the antenna groups that corresponds in position to the one of the beam forming chips.

7. The dual circularly polarized antenna array according to claim 6, wherein the insulating substrate has a regular polygonal region, and the M preset points are disposed in the regular polygonal region, so that a common contour of the M antenna groups is a regular polygon.

8. The dual circularly polarized antenna array according to claim 1, wherein the M feed modules are respectively defined as an N number of beam forming chips, and N is a positive integer less than M; wherein each of the beam forming chips is disposed between any two adjacent ones of the preset points, and any one of the beam forming chips is electrically coupled to the first feed points or the second feed points of the four antennas in two of the antenna groups.

9. The dual circularly polarized antenna array according to claim 1, wherein any two adjacent ones of the four antennas along the clockwise direction or the counterclockwise direction jointly have a 90-degree rotational symmetry relative to a corresponding one of the M preset points.

10. The dual circularly polarized antenna array according to claim 1, wherein the four antennas in each of the antenna groups are arranged in a cross-shaped pattern relative to one of the M preset points that corresponds in position thereto.

* * * * *